United States Patent Office

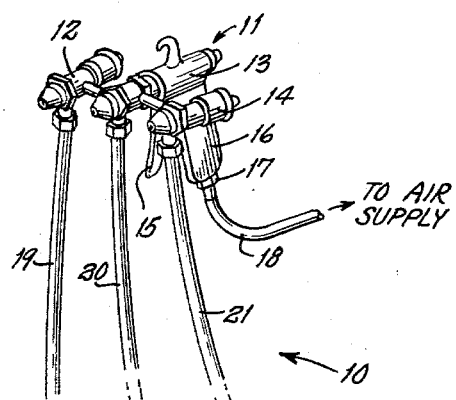
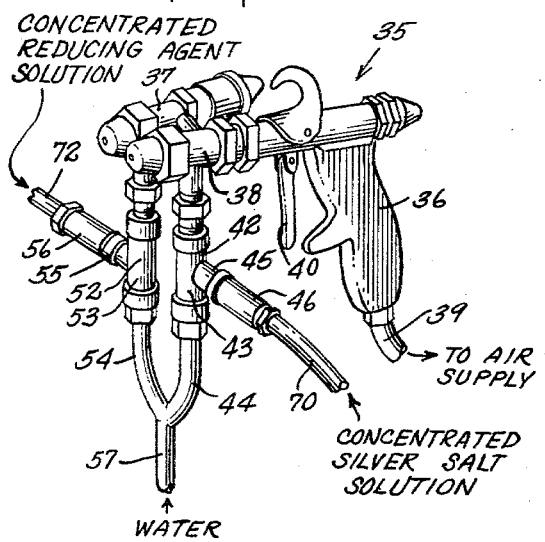
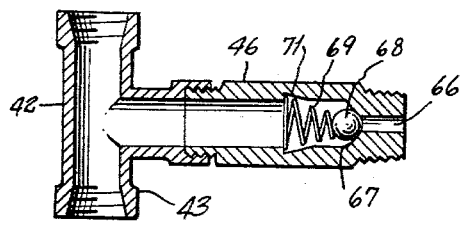
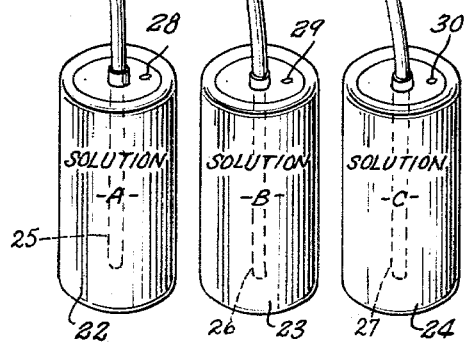

3,178,118
Patented Apr. 13, 1965

3,178,118
PLURAL SPRAY NOZZLE APPARATUS FOR
PRODUCING METALLIZED COATING
Fred M. New, 201 W. 77th St., New York, N.Y.
Filed Dec. 5, 1962, Ser. No. 242,474
1 Claim. (Cl. 239—422)

This invention relates to methods and apparatus for producing metallized surfaces.

In the manufacture of metallized surfaces by the presently employed commercial method, a dilute ammoniacal solution of a concentration of the order of 0.2 N of a water soluble silver salt is mixed in the mixing chamber of a gun or air brush with a dilute solution of a reducing agent of a concentration of the order of 0.2 N, and the resulting mixture is sprayed onto the surface. Concentrated solutions are not generally used in this method because of the inability to inject enough water to bring the concentration of the reactants to the required normality.

In accordance with one aspect of this invention, concentrated solutions of reactants in the manufacture of metallized surfaces are used with city water without danger of development of a cloudy effect on the metallized surface due to silver chloride formation. This is achieved by impinging simultaneously on a sensitized surface or matrix a stream of a concentrated ammoniacal solution of a water soluble silver salt, a stream of an aqueous solution of a reducing agent to reduce the silver of the silver salt to metallic silver, and a stream of water to effect the required normality. The reducing agent reacts with the silver salt instantly at the point of contact to reduce the silver salt to metallic silver. By passing the streams over the entire surface with the use of an air brush, for example, films of $12 \times 10^{-7}$ inches may be deposited in the order of two seconds.

In accordance with another aspect of this invention, dilute solutions of reactants for the manufacture of a silver coating on a surface are caused to be mixed on the surface on which the silver is to be deposited. For this purpose, a concentrated ammoniacal solution of a water-soluble silver salt may be passed continuously into a stream of water, such as distilled or demineralized water, to produce an ammoniacal silver salt solution stream, while into another stream of water is passed continuously a concentrated solution of a reducing agent to produce an aqueous reducing agent solution stream. The aqueous silver salt solution stream and the aqueous reducing agent solution stream are then impinged simultaneously upon the surface to be coated. At the point of contact the reducing agent reacts with the silver salt to reduce it instantly to metallic silver. With the aid of an air brush, an effective film of silver can be coated on a presensitized surface or matrix within a matter of two seconds.

In accordance with another aspect of this invention, the explosive hazards involved in the use of an alkali metal hydroxide in the practice of certain methods of silver deposition are substantially eliminated. This elimination is accomplished by impinging simultaneously upon substantially the same point of a sensitized surface or matrix, a stream of an ammoniacal solution of a water soluble silver salt, a stream of an aqueous solution of a reducing agent and a stream of an aqueous solution of an alkali metal hydroxide, such as sodium or potassium hydroxide. At the point of contact of the three solutions, the silver salt is reduced to metallic silver instantaneously and completely with no residues of soluble silver salts left to react and form the silver nitride or azide which is the cause of explosion in metallized surface production with the use of alkali metal hydroxide.

Conveniently, multiple nozzle spray guns are employed in the practice of the methods of this invention. If concentrated solutions of the reactants are employed in a method in which such solutions are diluted with large volumes of water, special apparatus of this invention are preferably used. This apparatus comprises an air brush having a plurality of spraying nozzles, conduit means associated with each of the nozzles for passing a stream of water through its respectively associated nozzle, means connected with each of the conduit means for introducing into the stream of water passing therethrough a concentrated solution of a reactant for the production of the silver coating and means for preventing water from the conduit means from passing into the concentrated solution of a reactant. This apparatus is particularly useful in the practice of the method of this invention involving the continuously passing into a stream of water a concentrated solution of a reactant such as an ammoniacal solution of a water soluble silver salt. Since a volume of the order of 25 to 100 or more times that of the concentrated solution of the reactant may be employed, water would not feed back into the concentrated solution when the stream is terminated or the gun is shut off. If means for preventing water from the conduit means from passing into the concentrated solution of the reactants, such as a check valve, were not employed, water would quickly pass from the water source to the concentrated solution of each reactant when the gun was shut off.

A more comprehensive understanding of this invention is obtained by reference to the following drawings in which:

FIG. 1 is a perspective view of an assembly utilized for impinging spraying solutions onto a sensitized matrix or surface.

FIG. 2 is a modification of the embodiment shown in FIG. 1, showing two nozzles rather than three nozzles as shown in FIG. 1, and FIG. 3 is a longitudinal section view of a check valve utilized in conjunction with either of the embodiments as shown in FIGS. 1 or 2.

Referring to FIG. 1 of the drawing, an assembly 10 comprises a multiple fluid air brush unit 11 containing a plurality of nozzles 12, 13 and 14 respectively, which are adapted to act in unison when the trigger 15 of handle 16 is operated. A commercial unit known as Paasche multiple fluid air brush may be used for this purpose. The unit handle 16 of the assembly is provided with a connection 17 for fixing thereto a hose or conduit 18 connected with a source of air supply.

Each of the nozzles 12, 13 and 14, respectively, is connected with a conduit or hose 19, 20 and 21, respectively, which in turn is connected with a source of supply to containers 22, 23 and 24, respectively, through siphons 25, 26 and 27, respectively, each of which extends to the bottom of its respectively associated container. The containers 22, 23 and 24 have also been marked as solution A, B and C, respectively. Each of the containers 22, 23 and 24 has a small orifice 28, 29 and 30, respectively, to permit the entry of air in the container after withdrawal of the solution therefrom.

Container 22 contains a solution A of ammoniacal silver nitrate; container 24 contains a solution C of a suitable reducing agent, such as formaldehyde, dextrose, hydrazine tartrate or sulfate; container 23 contains a solution B of sodium hydroxide. Alternately, a hose or conduit 20 may be connected to a source of water, such as a city water supply system, instead of to the container 23. These solutions are prepared in the proper concentrations so that when trigger 15 is drawn backward against handle 16, an air supply under pressure, through conduit 18 goes through handle 16 through the nozzles to draw up a supply of solutions from containers 22, 23 and 24. A predetermined amount of each of the solutions is drawn by suction from each container to escape as sprays through its respectively associated nozzles and to impinge simultaneously on a sensitized surface or matrix for a predetermined time in order to obtain the desired deposit of the silver on the matrix at the point of impingement.

By the utilization of this type of assembly, the hazards ordinarily present in other types of equipment used in spraying a plurality of solutions are eliminated since the reduction of metallic silver from the silver solution is instantaneous and complete with no residue of insoluble silver salts left to react and form the silver nitride or azide, as employed in previously used methods.

In the modified embodiment shown in FIG. 2, a gun unit 35 consists of a handle 36 and spray nozzles 37 and 38. The handle 36 is provided with a hoze connection 39 for a source of air supply operable by a trigger 40.

Nozzle 38 is provided with a check valve assembly 42, which in turn is connected with nozzle 38 and is in the form of a T or Y, but preferably in a T form. The shorter portion 43 of the assembly is connected with one arm 44 of a Y element connected to a source of water supply, while the longer end 45 of assembly 42 is connected with a check valve 46, such as shown in detail in FIG. 3.

An assembly 52, similar to that of the check valve assembly 42, is connected with nozzle 37. The shorter portion 53 of the assembly 52 is connected with the other arm 54 of the Y element connected to the source of water supply through arm 57 of the Y element. The longer end 55 is connected with a check valve assembly 56, identical with that shown in detail in FIG. 3.

The check valve 46 shown in FIG. 3 comprises a small orifice 66 with a seat 67 for a ball bearing 68 and a spring 69 which rests in a circular recess 71 of the valve, whereby the spring 69 presses ball bearing 68 against the ball seat 67. Check valve 46 is connected through the orifice 66 and hose 70 to a container (not shown) having a concentrated ammoniacal solution of a silver salt in it. The similar check valve 56 is connected through an orifice similar to the orifice 66 of FIG. 3 and hose 72 to a container (not shown) having a solution of reducing agent in it.

In the practice of the methods of this invention, the concentration of the silver salt solution, reducing agent and alkali metal hydroxide, if employed, may vary over wide limits. Desirably, the dilution at the point of impingement on the sensitized surfaces to be coated should approximate that employed in known methods. An example of desired molar reduction of the concentrated solutions is as follows:

| Concentration of solution: | Molar solution desired |
| --- | --- |
| Ammoniacal silver nitrate (4 molar) | 0.04 |
| Formaldehyde (40% formalin) | 0.02 |
| Sodium hydroxide (4 molar) | 0.01 |

If the solutions were employed with the apparatus illustrated in FIG. 1, the 4 molar ammoniacal silver nitrate solution could be contained in container 22, while the concentrated formaldehyde and 4 molar sodium hydroxide solution could comprise a mixture in container 24. The conduit 20 could be connected to a water supply system instead of to the container 23. In the example given, the aperture through which the ammoniacal silver nitrate solution, the mixture of formaldehyde and sodium hydroxide and the water from the water supply system would pass into the hoses or conduits 19, 21 and 20, respectively, would be such that the volumes would be in the proportions of 1 of ammoniacal silver nitrate, 4 of the mixture of formaldehyde and sodium hydroxide, and 100 volumes of water. When the trigger 15 is drawn backward, there is impinged upon a point of the sensitized surface to be coated the three streams af ammoniacal solution, a mixture of formaldehyde and sodium hydroxide, and water in the correct proportions for reaction. The silver of the silver nitrate is immediately reduced to coat the surface at that point with metallic silver and a mirrored surface is produced within a matter of seconds.

The apparatus shown in FIG. 2 is employed to pass continuously into one stream of water such as distilled or demineralized water passing through the arm 44, a concentrated solution of a water soluble silver salt such as silver nitrate. There is passed continuously into another stream of water from the other arm 54 a concentrated solution of a reducing agent from hose 72 through check valve 56. If desired, the concentrated solution of a reducing agent may also have mixed with it an alkali metal hydroxide. The hose 70 of the check valve 46 is connected to a container holding the concentrated ammoniacal solution of the silver salt such as the 4 molar ammoniacal silver nitrate solution as given in the above example, while the hose 71 of the check valve 56 is connected to a container holding a 40% formalin solution with or without a 4 molar sodium hydroxide solution, as given in the above example. The aperture of the check valve 46 is of a cross-sectional area to inject 1 volume of the concentrated ammoniacal silver soltuion to each 100 volumes of water passing through the check valve assembly 42 from the source of water supply, while the aperture of the check valve 56 is of a cross-sectional area to permit the passage of 1 volume of the reducing agent solution for each 25 volumes of water passing through the check valve assembly 52. The backward movement of the trigger 40 results in the impinging upon substantially the same point of a sensitized surface of a solution of an 0.04 molar solution of ammoniacal silver nitrate from nozzle 38 and an 0.02% of formaldehyde solution from nozzle 37, with or without 0.01 molar sodium hydroxide. The reactants in the impinged diluted solutions interact to deposit instantaneously silver on the sensitized surface and a huge area may be coated with a silver surface by the movement of the air brush shown in FIG. 2 in a matter of seconds. If different dilutions of the reactants are desired, the cross-sectional area of the apertures may be varied or the volume of water passing from the source of water supply through the check valve assemblies 42 and 52 may be regulated.

What is claimed is:

An apparatus for producing a silver coating comprising a fluid supply system comprising a fluid supply tube for a diluent having a Y tube at its outlet end, separate supply tubes for separate concentrated reactants having connecting means connecting said tubes into each branch of the Y tube and defining with each branch of the Y tube separate mixing chambers, said connecting means having means preventing said liquid diluent from passing into said concentrated source of supply, each branch of the Y tube connected to separate converging spray nozzles defining an air brush, whereby diluted reactants from said converging spray nozzles are impinged on a surface to react at the point of impingement without intermingling prior to said impingement.

(References on following page)

References Cited by the Examiner

UNITED STATES PATENTS

| | | | |
|---|---|---|---|
| 191,969 | 6/77 | Imlay | 239—428 |
| 1,729,634 | 10/29 | Thompson | 239—428 |
| 1,840,842 | 1/32 | Huff | 239—418 |
| 1,876,610 | 9/32 | Case | 239—422 |
| 2,176,682 | 10/39 | Pedrick | 239—427 |
| 2,513,081 | 6/50 | Clark et al. | |
| 2,559,544 | 7/51 | Paasche. | |
| 2,564,392 | 8/51 | Barrucker | 239—307 |
| 2,813,751 | 11/57 | Barrett. | |
| 2,823,143 | 2/58 | Upperman | 117—105.5 |
| 2,948,480 | 8/60 | Budwig | 239—418 |
| 2,955,058 | 10/60 | Foster | 117—105.5 |

FOREIGN PATENTS 627,410  9/61  Canada.

LOUIS J. DEMBO, *Primary Examiner.*

JOSEPH B. SPENCER, EVERETT W. KIRBY,
*Examiners.*